United States Patent
Ellison et al.

(10) Patent No.: US 9,714,192 B2
(45) Date of Patent: Jul. 25, 2017

(54) ION EXCHANGEABLE GLASS WITH ADVANTAGED STRESS PROFILE

(71) Applicant: Corning Incorporated, Corning, NY (US)

(72) Inventors: Adam James Ellison, Corning, NY (US); Benjamin Zain Hanson, Big Flats, NY (US); Rostislav Vatchev Roussev, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 21 days.

(21) Appl. No.: 14/174,309

(22) Filed: Feb. 6, 2014

(65) Prior Publication Data
US 2014/0227524 A1    Aug. 14, 2014

Related U.S. Application Data

(60) Provisional application No. 61/762,422, filed on Feb. 8, 2013.

(51) Int. Cl.
    B32B 17/00    (2006.01)
    C03C 21/00    (2006.01)
    C03C 3/091    (2006.01)

(52) U.S. Cl.
    CPC ............ C03C 21/002 (2013.01); C03C 3/091 (2013.01); *Y10T 428/315* (2015.01)

(58) Field of Classification Search
    USPC ........ 428/426, 428, 432, 409, 410; 65/30.14
    See application file for complete search history.

(56) References Cited

U.S. PATENT DOCUMENTS

| 8,187,987 B2 * | 5/2012 | Amin | C03C 3/083 501/66 |
| 8,349,455 B2 * | 1/2013 | Kondo | C03C 3/085 428/410 |

(Continued)

FOREIGN PATENT DOCUMENTS

KR    2012128657    11/2012

OTHER PUBLICATIONS

Roger Araujo; "Interdiffusion in a one-dimensional interacting system"; Journal of Non-Crystalline Solids 152 (1993); pp. 70-74.

(Continued)

*Primary Examiner* — Lauren R Colgan
(74) *Attorney, Agent, or Firm* — Kevin M. Johnson

(57) ABSTRACT

Ion exchangeable glass compositions that develop concentration profiles and stress profiles that have higher magnitudes of concentration and compressive stress profiles than those provided by the error function (erfc)-shaped compressive stress profile for similar surface concentrations of stress-inducing components such as $K^+$ or $K_2O$ and stresses. The advantaged stress profile is the result of a glass composition that is low in $K_2O$ (or potassium) in the base glass prior to ion exchange. A glass comprising lower amounts of $K^+$ or $K_2O$ has a stronger dependence of diffusivity on concentration, leading to a non-erfc-shaped concentration profile. Several glass compositions that contain low amounts of $K^+$ or $K_2O$ exhibit this beneficial effect, whereas other glasses containing higher amounts of $K^+$ or $K_2O$ do not exhibit this effect.

23 Claims, 9 Drawing Sheets

(56) References Cited

U.S. PATENT DOCUMENTS

| | | | |
|---|---|---|---|
| 8,889,575 B2* | 11/2014 | Boek | C03C 3/091 428/410 |
| 8,951,927 B2 | 2/2015 | Dejneka et al. | |
| 8,969,226 B2* | 3/2015 | Dejneka | C03C 3/091 501/66 |
| 2003/0220183 A1* | 11/2003 | Kurachi | C03C 3/087 501/70 |
| 2005/0003136 A1* | 1/2005 | Kurachi | C03C 3/085 428/846.9 |
| 2005/0250639 A1 | 11/2005 | Siebers et al. | 501/68 |
| 2008/0286548 A1* | 11/2008 | Ellison | C03C 3/091 428/220 |
| 2009/0197088 A1* | 8/2009 | Murata | C03C 3/083 428/410 |
| 2009/0220761 A1* | 9/2009 | Dejneka | C03B 17/067 428/220 |
| 2010/0035745 A1* | 2/2010 | Murata | C03C 3/083 501/66 |
| 2010/0291353 A1* | 11/2010 | Dejneka | C03B 33/0222 428/192 |
| 2011/0014475 A1* | 1/2011 | Murata | C03B 17/064 428/410 |
| 2011/0281093 A1* | 11/2011 | Gulati | B32B 37/144 428/213 |
| 2011/0294648 A1* | 12/2011 | Chapman | C03C 21/002 501/63 |
| 2012/0171497 A1* | 7/2012 | Koyama | C03C 3/085 428/428 |
| 2012/0194974 A1 | 8/2012 | Weber et al. | 361/679.01 |
| 2012/0196110 A1* | 8/2012 | Murata | C03B 25/08 428/220 |
| 2013/0004758 A1* | 1/2013 | Dejneka | C03C 3/087 428/220 |
| 2013/0224492 A1* | 8/2013 | Bookbinder | C03C 21/002 428/410 |
| 2013/0236666 A1* | 9/2013 | Bookbinder | C03C 3/083 428/34.4 |
| 2014/0120279 A1* | 5/2014 | DeMartino | C03B 27/065 428/34.6 |
| 2014/0141226 A1* | 5/2014 | Bookbinder | C03C 3/095 428/220 |
| 2014/0186632 A1* | 7/2014 | Dejneka | C03C 3/083 428/410 |
| 2015/0074974 A1* | 3/2015 | Pesansky | C03C 3/093 29/446 |
| 2015/0157533 A1* | 6/2015 | DeMartino | B32B 17/06 206/438 |

OTHER PUBLICATIONS

René Gy; "Ion exchange for glass strengthening"; Materials Science and Engineering B 149 (2008); pp. 159-165.

Helfferich et al.; "Ion Exchange Kinetics. A Nonlinear Diffusion Problem"; The Journal of Chemical Physics, vol. 28, No. 3, Mar. 1958; pp. 418-424.

* cited by examiner

ION EXCHANGEABLE GLASS WITH ADVANTAGED STRESS PROFILE

This application claims the benefit of priority under 35 U.S.C. §119 of U.S. Provisional Application Ser. No. 61/762422 filed on Feb. 8, 2013, the content of which is relied upon and incorporated herein by reference in its entirety.

BACKGROUND

Ion exchange is used to strengthen glass by creating a region of compressive stress near the glass surface. The survival of an ion exchanged sample in various strength tests such as ball drop, ring-on-ring, abraded ring-on-ring, and four point bend tests depends on the magnitude of the compressive stress (CS) at the surface, the depth of penetration of the compressive stress into the body or bulk of the glass (depth of layer DOL), and, generally, the overall shape of the stress profile. A stress profile with greater compressive stress at intermediate and greater depths is more likely to survive such tests without breaking, especially in tests that include abrasion where flaws are introduced to particular depths. One goal of ion exchange is to maintain adequate compressive stress at the location of any flaw or initiated crack, including the deepest surface-initiated flaws, in order to prevent the crack from growing. In typical ion exchange processes that involve only a single salt bath (as opposed to two salt baths in succession or a salt bath followed by heating in air followed by another salt bath), a concentration profile resembling an "error function" (complementary error function, or "erfc") is developed, which is a solution of the linear diffusion equation characterized by a constant diffusion coefficient. The stress profile shape typically follows the shape of the concentration profile, so the stress profile also develops a shape resembling an erfc. This shape is not optimal for delivering high compressive stress at intermediate and larger depths into the sample.

SUMMARY

The present disclosure provides ion exchangeable glass compositions that develop concentration profiles and stress profiles that have higher magnitudes of concentration and compressive stress profiles than those provided by the erfc-shape for similar surface concentrations of stress-inducing components such as $K^+$ or $K_2O$ and stresses. The higher compressive stress at intermediate depths than that of the erfc-shaped profile confers better damage resistance to this glass when ion exchanged to the same nominal DOL, as measured by a standard surface stress meter like FSM-6000. The advantaged stress profile is the result of a glass composition that is low in $K_2O$ (or potassium) in the base glass prior to ion exchange. As used herein, a reference made to K (or $K^+$), generally refers to the larger exchanging ion while Na (or $Na^+$) refers to the smaller exchanging ion. A glass comprising lower amounts of $K^+$ or $K_2O$ has a stronger dependence of diffusivity on concentration, leading to a non-erfc-shaped concentration profile. In the other limit, in which the $K_+$ concentration is relatively higher in the base glass, the dependence of diffusivity on concentration is smaller, and leads to a concentration profile that more closely resembles the erfc-shape. The erfc-shape arises from a constant diffusivity that is independent of concentration. Several glass compositions that contain low amounts of $K^-$ or $K_2O$ exhibit this beneficial effect, whereas other glasses containing higher amounts of $K^+$ or $K_2O$ do not exhibit this effect.

The glasses described herein achieve better damage resistance after a single ion exchange step (e.g., immersion in a single salt bath) than other glasses that, when ion exchanged, have the erfc-shaped concentration profile. This improved damage resistance allows better performance of the final strengthened glass product without the need of expensive additional ion exchange or heating steps that could be used to manipulate the stress profile into a more advantaged shape. Furthermore, the inventive glasses allow the advantaged shape of the stress profile to be obtained while maintaining high surface stress which, unlike a two-step process where the second step is a simple heating step, leads to better strength at least in non-abraded ring-on-ring tests. The glasses described herein exhibit higher compressive stress at medium depths (roughly half the penetration depth, DOL) than those glasses having the erfc-shaped concentration profile. At the same time, the glasses described herein have lower compressive stress at much larger depths (i.e., go more abruptly to tension) that may be irrelevant for strength, so their stress profile shape is more favorable for controlled fracture. This benefit arises because the reduced compressive stress at these less relevant large depths (relative to the erfc-shape) requires less balancing tensile stress in the interior, which is favorable for controlled fracture (sometimes called frangibility).

Accordingly, one aspect of the disclosure is to provide an alkali aluminosilicate glass having a layer under a compressive stress CS(d) that varies as a function of depth d from the surface to a depth of layer DOL, wherein $CS(d) > CS_{erfc}(d)$ at $0 < d \leq DOL$, where $CS_{erfc}(d)$ is a compressive stress at depth d determined from an error function erfc.

In another aspect, the disclosure provides an ion exchanged glass comprising a first alkali metal cation and a second alkali metal cation, wherein the first alkali metal cation is larger than the second alkali metal cation. The compressive stress $\sigma(d)$ at a depth d is given by the equation $\sigma(d) = (BE/1-v)(C_{avg} - C(d))$, where B is the lattice dilation coefficient, E is Young's modulus, v is the Poisson ratio, C(d) is the concentration of the larger ion, and $C_{avg}$ is the average concentration.

In yet another aspect a method of ion exchanging a glass is provided. The method comprises ion exchanging an alkali aluminosilicate glass in a single ion exchange bath, wherein the alkali aluminosilicate glass comprises at least 14 mol % $Na_2O$ and from 0 mol % to about 2.5 mol % $K_2O$. The ion exchanged glass has a layer under a compressive stress CS(d) that varies as a function of depth d from the surface to a depth of layer DOL, wherein $CS(d) > CS_{erfc}(d)$ at $0 < d \leq DOL$, where $CS_{erfc}(d)$ is a compressive stress at depth d determined from an error function erfc.

These and other aspects, advantages, and salient features will become apparent from the following detailed description, the accompanying drawings, and the appended claims.

DETAILED DESCRIPTION

Figure 1:
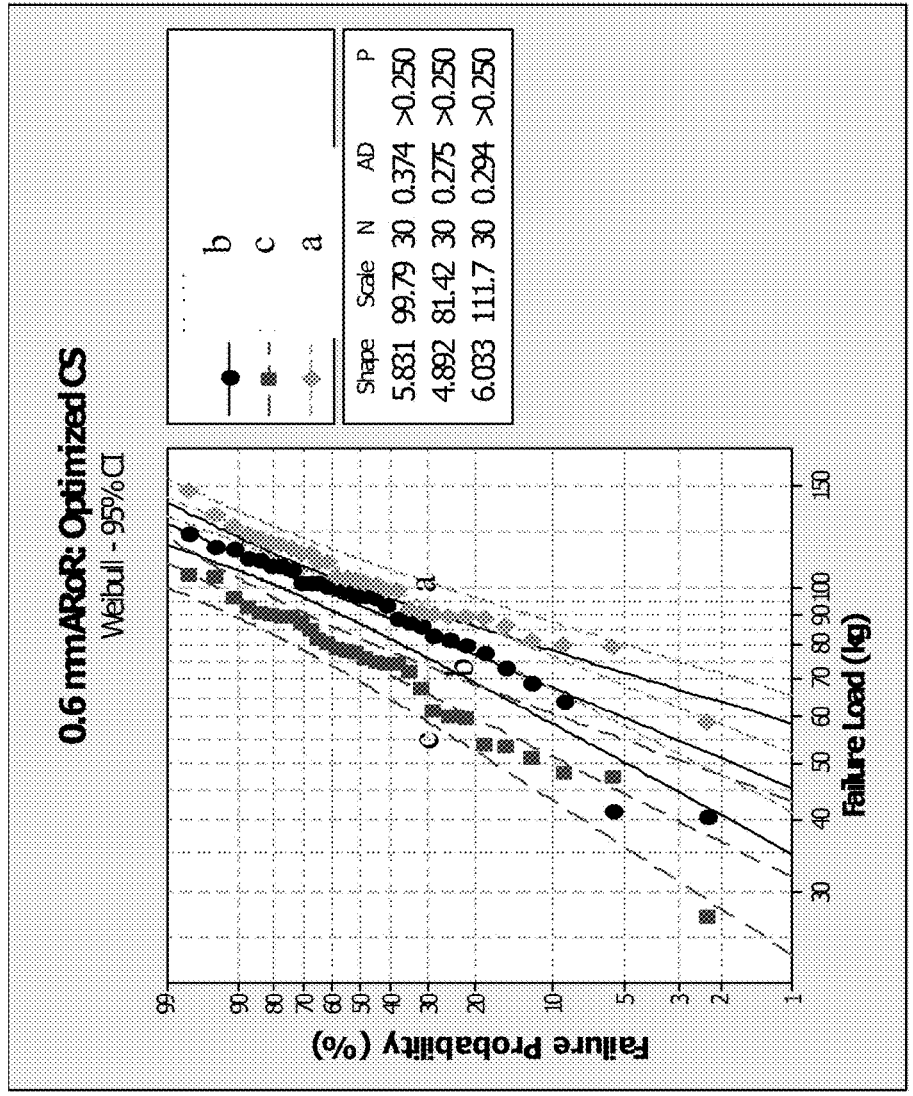
FIG. 1 shows abraded ring-on-ring damage resistance tests comparing a glass having a compressive stress that is greater than the erfc stress profile versus two glasses having erfc-like stress profiles.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass" and "glasses" includes both glasses and glass ceramics. The terms "glass article" and "glass articles" are used in their broadest sense to include any object made wholly or partly of glass and/or glass ceramic. Unless otherwise specified, all compositions and concentrations are expressed in mole percent (mol %). The terms "$K^+$," "K," and "potassium" as used herein refer to potassium cations as they exist in glass and materials that are batched in the manufacture of glass, unless otherwise specified. As used herein, the terms "concentration" and "concentration profile" refer to the $K^+$ concentration and $K^+$ concentration profile near the surface of the glass, and "stress profile" refers to the compressive stress profile near the surface of the glass, unless otherwise specified. Unless otherwise specified, the term "ion exchange" as used in the examples described herein refers to the exchange of $Na^+$ ions present within a glass with $K^+$ ions. In the ion exchange processes described herein, the glass is immersed one time in a bath consisting almost entirely (i.e., greater than 90 percent by weight (wt %)) of at least one potassium salt such as, for example, $KNO_3$.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Described herein are glass compositions which, when ion exchanged, develop a surface concentration profile and stress profile that has higher magnitude of compressive stress than the error function (also referred to herein as "erfc") shape for ion exchanged glass having similar surface concentration and stress. The higher compressive stress at intermediate depths (e.g., depths that are about midway between the surface and the depth of the compressive layer (DOL)) than that of the erfc-shaped profile confers better damage resistance to this glass when ion exchanged to the same nominal DOL, as measured by a standard surface stress meter such as, for example, the FSM-6000. The advantaged stress profile is the result of glass composition that is low in $K_2O$ (or potassium) in the base glass prior to ion exchange. As used herein, reference to $K^+$ or K generally refers to the larger exchanging ion while $Na^+$ or Na refers to the smaller exchanging ion. A glass having a lower K concentration has a stronger dependence of diffusivity on concentration, leading to an "advantaged" non-erfc shaped concentration profile. In those instances in which the K concentration of the base glass is relatively higher, the concentration dependence of the diffusivity is smaller. This leads to a concentration profile that more closely resembles the erfc shape. The erfc shape is what arises from a constant diffusivity that is independent of concentration. Several glass compositions that have relatively low K concentrations exhibit this beneficial non-erfc effect, while other glasses that have higher K concentrations do not exhibit this effect.

Following a single ion exchange step (e.g., immersion in a single salt bath), the glasses described herein achieve better damage resistance than those glasses that exhibit an erfc-shaped concentration profile when ion exchanged. This improved damage resistance allows better performance of the final strengthened glass product without the need of expensive additional ion exchange or heating steps that could be used to manipulate the stress profile into a more advantaged shape. Furthermore, the glasses described herein glasses allow the advantaged shape of the stress profile while maintaining high surface stress. In contrast, a two-step process in which the second step is a simple heating step leads to better strength at least in non-abraded ring-on-ring tests.

The glasses described herein have higher compressive stress (CS) at medium depth (i.e., roughly half the penetration depth DOL), which exceeds the stress values exhibited by ion exchanged glasses having the erfc shaped concentration profile and is more favorable for controlled fracture. At the same time, the glasses described herein have lower compressive stress at much larger depths—i.e., the stress in the ion exchanged glass goes more abruptly from compression to tension. This benefit arises because the reduced compressive stress at these less relevant large depths (relative to the erfc shape) requires less balancing of tensile stress in the interior, which is favorable for controlled fracture (sometimes called frangibility).

FIG. 1 is a plot of abraded ring-on-ring (ARoR) damage resistance tests comparing ion exchanged Corning Gorilla® Glass Code 2319 (a in FIG. 1; nominal composition 68.96 mol % $SiO_2$, 0 mol % $B_2O_3$, 10.28 mol % $Al_2O_3$, 15.21 mol % $Na_2O$, 0.012 mol % $K_2O$, 5.37 mol % MgO, 0 mol % CaO, 0.17 mol % $SnO_2$), Corning Gorilla® Glass Code 2318 (b in FIG. 1; nominal composition 69.19 mol % $SiO_2$, 0 mol % $B_2O_3$, 8.52 mol % $Al_2O_3$, 13.94 mol % $Na_2O$, 1.174 mol % $K_2O$, 5.37 mol % MgO, 0.54 mol % CaO, 0.19 mol %

SnO$_2$), and Corning Gorilla® Glass Code 4318 (c in FIG. 1; nominal composition 64.74 mol % SiO$_2$, 5.14 mol % B$_2$O$_3$, 13.94 mol % Al$_2$O$_3$, 13.72 mol % Na$_2$O, 0 mol % K$_2$O, 2.38 mol % MgO, 0 mol % CaO, 0.08 mol % SnO$_2$). All three glasses have a compressive depth of layer DOL of 42 microns (μm). Glass Code 2319, which has a non-erfc stress profile, shows better failure resistance even with slightly lower CS than that of Glass Code 4318. Corning Gorilla® Glass Code 2319 has the advantaged K$_2$O concentration profile shown in FIG. 6.

Figure 2:
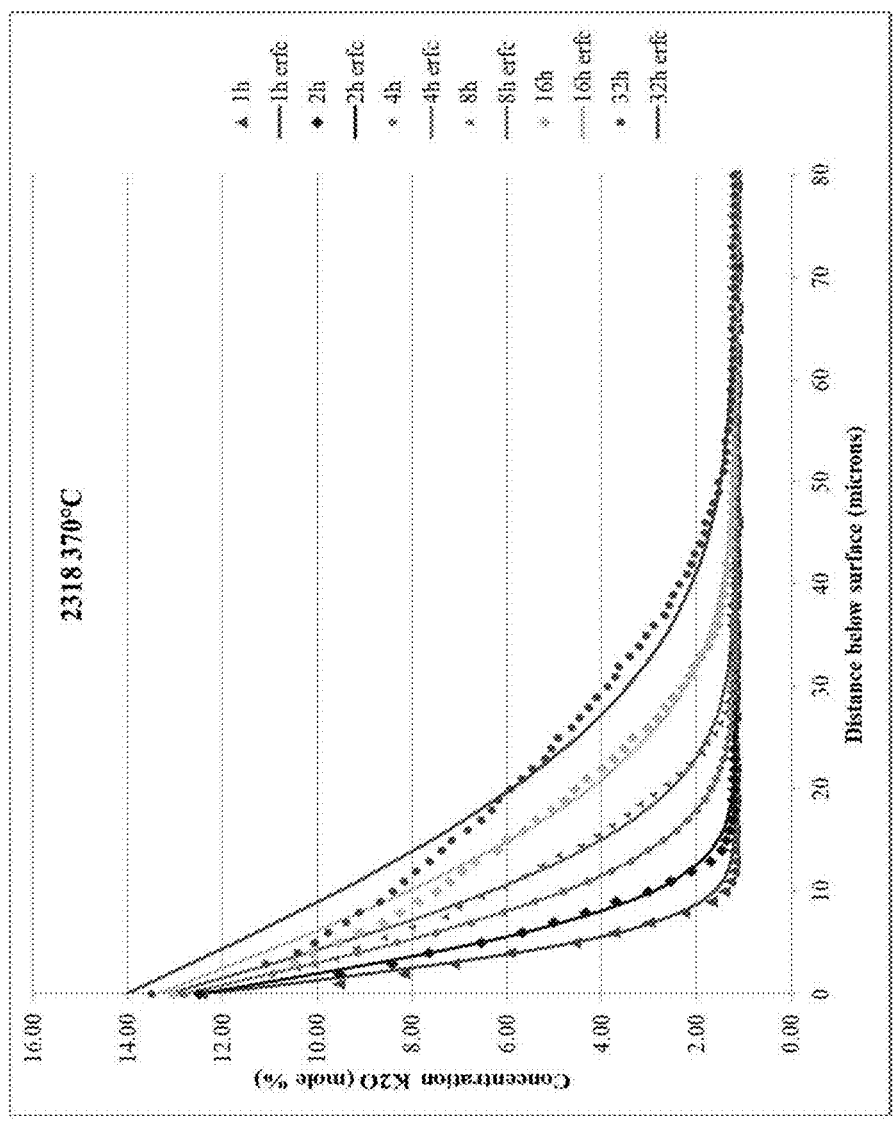
FIGS. 2-5 show concentration profiles of non-inventive glasses that either stay close to the erfc line or fall below it.

FIGS. 2-5 show typical K$_2$O concentration profiles of glasses that either closely adhere to or are less than the erfc shape, giving compressive stresses that are reduced at depth relative to that of glasses in which the K$_2$O concentration profile is greater than that predicted by the error function. K$_2$O concentration profiles for Corning Gorilla® Glass Code 2318 following ion exchange at 370° C. are plotted in FIG. 2 for a range of ion exchange times. At shorter times, the K$_2$O concentration profiles (represented by symbols in FIG. 2) closely follow the erfc function (represented by solid lines in the figure). At longer times, the K$_2$O concentration falls below the erfc line at around depths of 10 μm to 20 μm below the surface, which means the stress will also be less compressive at those depths. The profiles shown in FIG. 2 are not "advantaged" profiles; i.e., the compressive stress does not exhibit a significantly positive variation from the error function.

Figure 3:
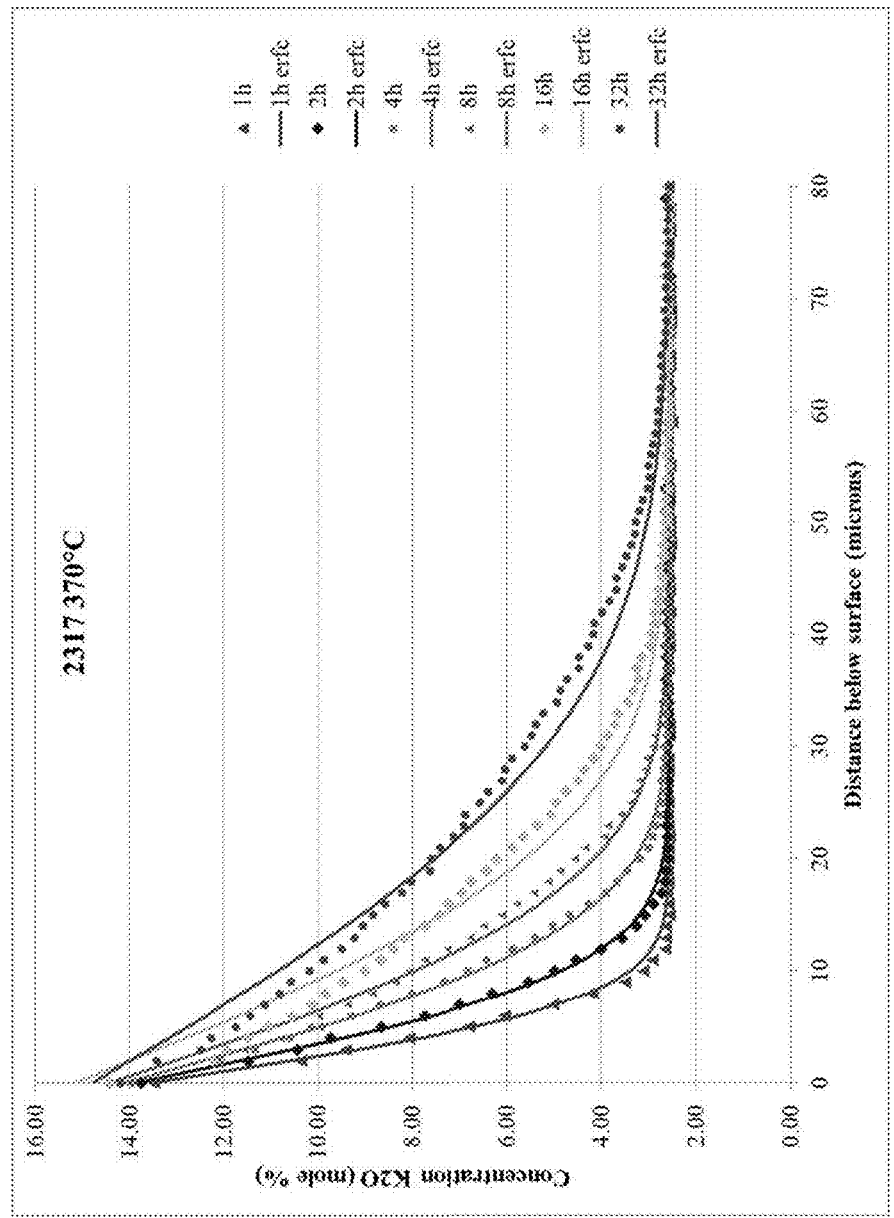
Figure 4:
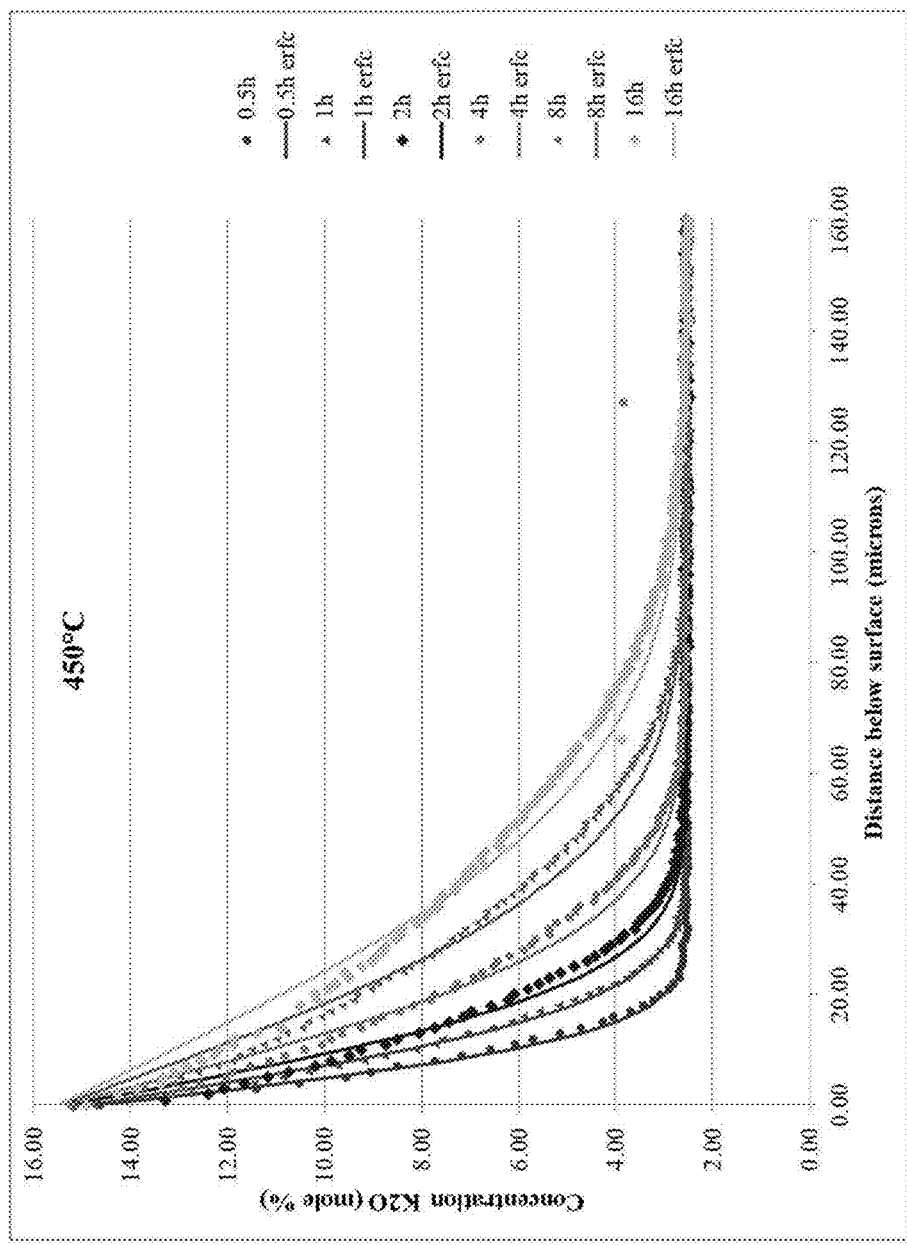
Figure 5:
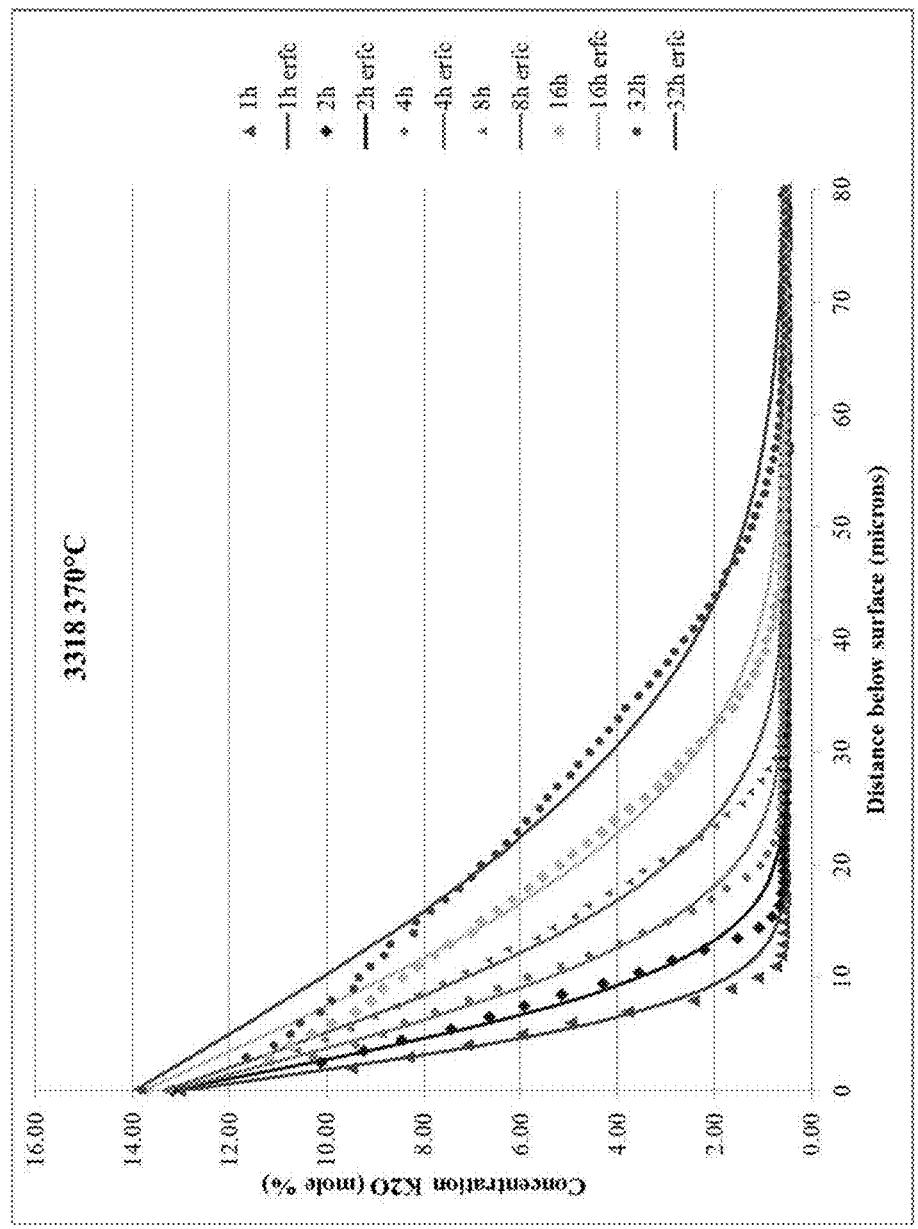

K$_2$O concentration profiles for Corning Gorilla® Glass Code 2317 (nominal concentration 66.37 mol % SiO$_2$, 0.60 mol % B$_2$O$_3$, 10.29 mol % Al$_2$O$_3$, 13.80 mol % Na$_2$O, 2.399 mol % K$_2$O, 5.74 mol % MgO, 0.59 mol % CaO, 0.21 mol % SnO$_2$) following ion exchange at 370° C. are plotted in FIG. 3. The K$_2$O concentration profiles in FIG. 3 exhibit behavior which is opposite that of the desired advantaged stress profile. FIG. 4 is a plot of K$_2$O concentration profiles for Corning Gorilla® Glass Code 2317 following ion exchange at 450° C. The K$_2$O concentration profiles again exhibit behavior that is opposite that of the desired advantaged stress profile. FIG. 5 is another plot like those of FIGS. 2-4 showing the wrong trend with respect to the erfc-shape. This example is for glass 3318 at 370° C.

Figure 6:
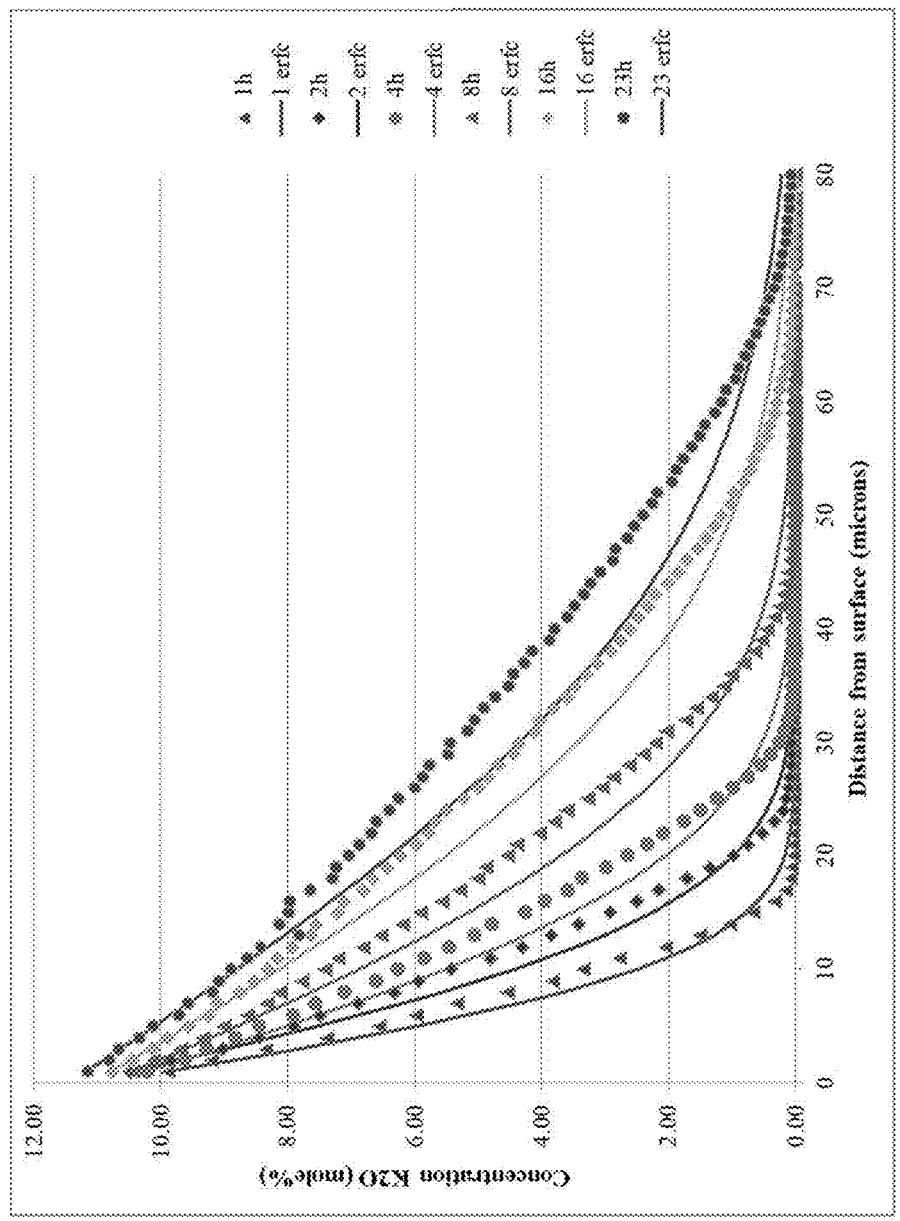
FIG. 6 shows a concentration profile of a glass having a compressive stress that is greater than the erfc stress profile.

FIG. 6 is a plot of K$_2$O concentration profiles (represented by symbols in the figure) of Corning Gorilla® Glass Code 2319 samples ion exchanged at 410° C. for the indicated times in hours. All concentration and stress profiles are greater than the corresponding erfc profiles (represented by lines). Unlike in the glasses shown in FIGS. 2-5, the concentration profiles plotted in FIG. 6 exceed the erfc-shape over most of the K2O penetration depth until they cross over the respective erfc lines and fall almost abruptly to zero. The glasses described herein exploit this shape to produce the beneficial damage resistance shown in FIG. 1.

Figure 7:
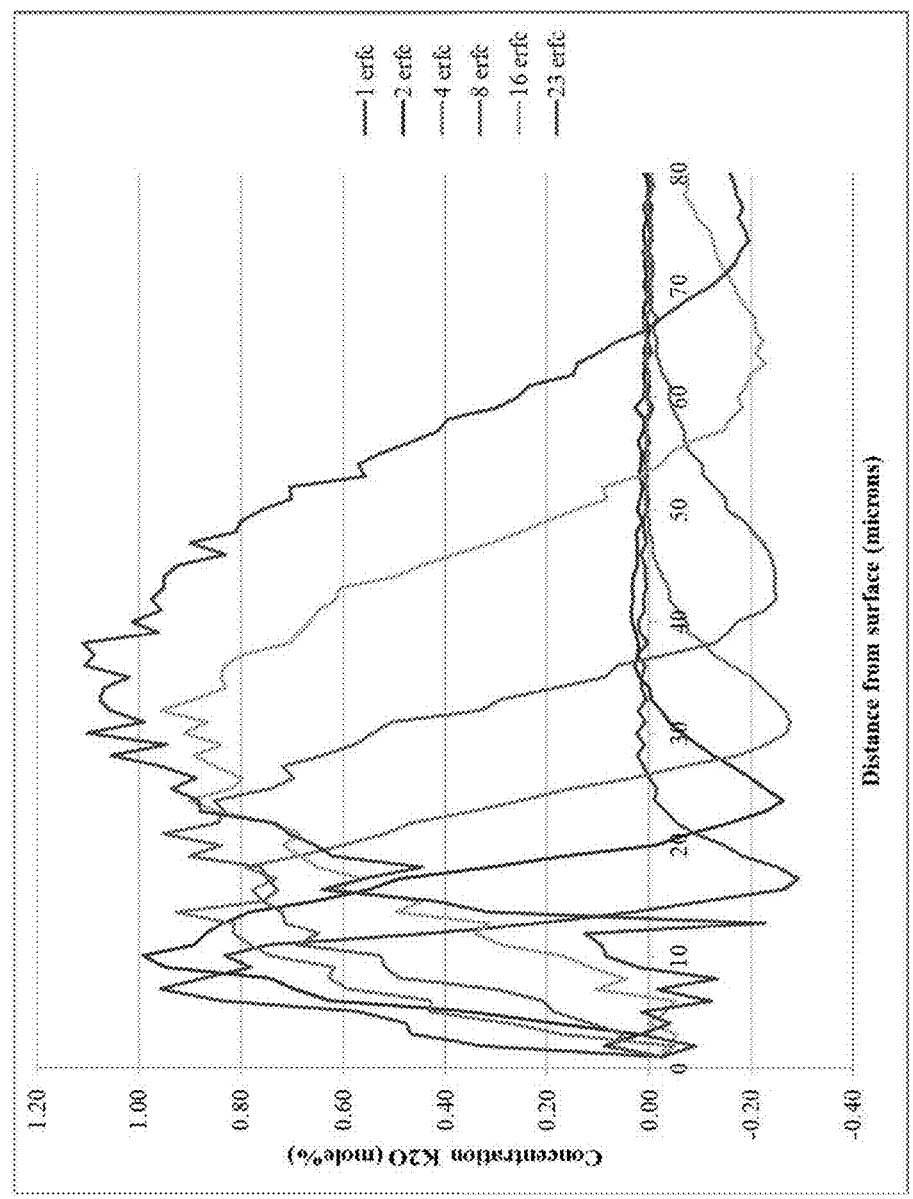
FIG. 7 shows concentration minus erfc curve calculated for the data shown in FIG. 6.

FIG. 7 is a plot of K$_2$O concentration (represented by symbols in FIG. 6) minus erfc (the solid lines in FIG. 6) for each case shown in FIG. 6. FIG. 7 shows the overall trend of K$_2$O concentrations exceeding the erfc line through most of the compressive layer until the concentration values finally cross over the erfc line near the tail of the line near the DOL. The higher K$_2$O concentration confers higher compressive stress over the intermediate depths (i.e., the surface to d depth d, wherein d<DOL) where flaws and/or impact damage are most likely to occur.

Figure 8:
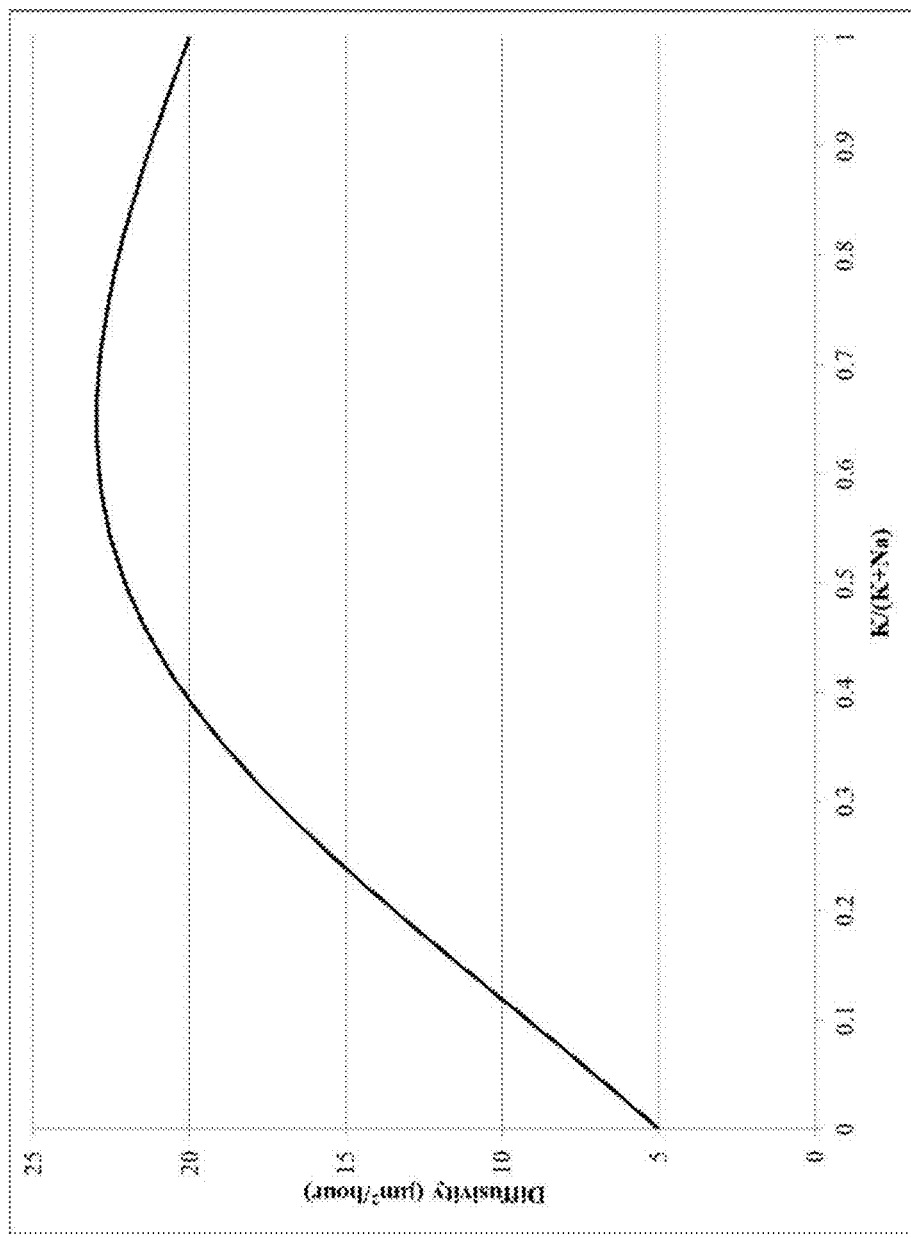
FIG. 8 shows a typical concentration-dependent diffusivity for strengthening ion exchange of K for Na.

A schematic representation of concentration-dependent diffusivity vs. the scaled (relative) proportion of K$^+$ in glass is shown in FIG. 8. At high K$^+$ concentrations, the diffusivity near the glass surface is high, whereas the concentration-dependent diffusivity is much lower in those instances where the K$^+$ concentration is very low.

The beneficial performance observed for Corning Gorilla® Glass Code 2319 (FIG. 1) is the product of the special shape of the K$_2$O concentration profile shown in FIG. 6, in contrast to the more typical erfc-shaped profiles of FIGS. 2-5.

Figure 9:
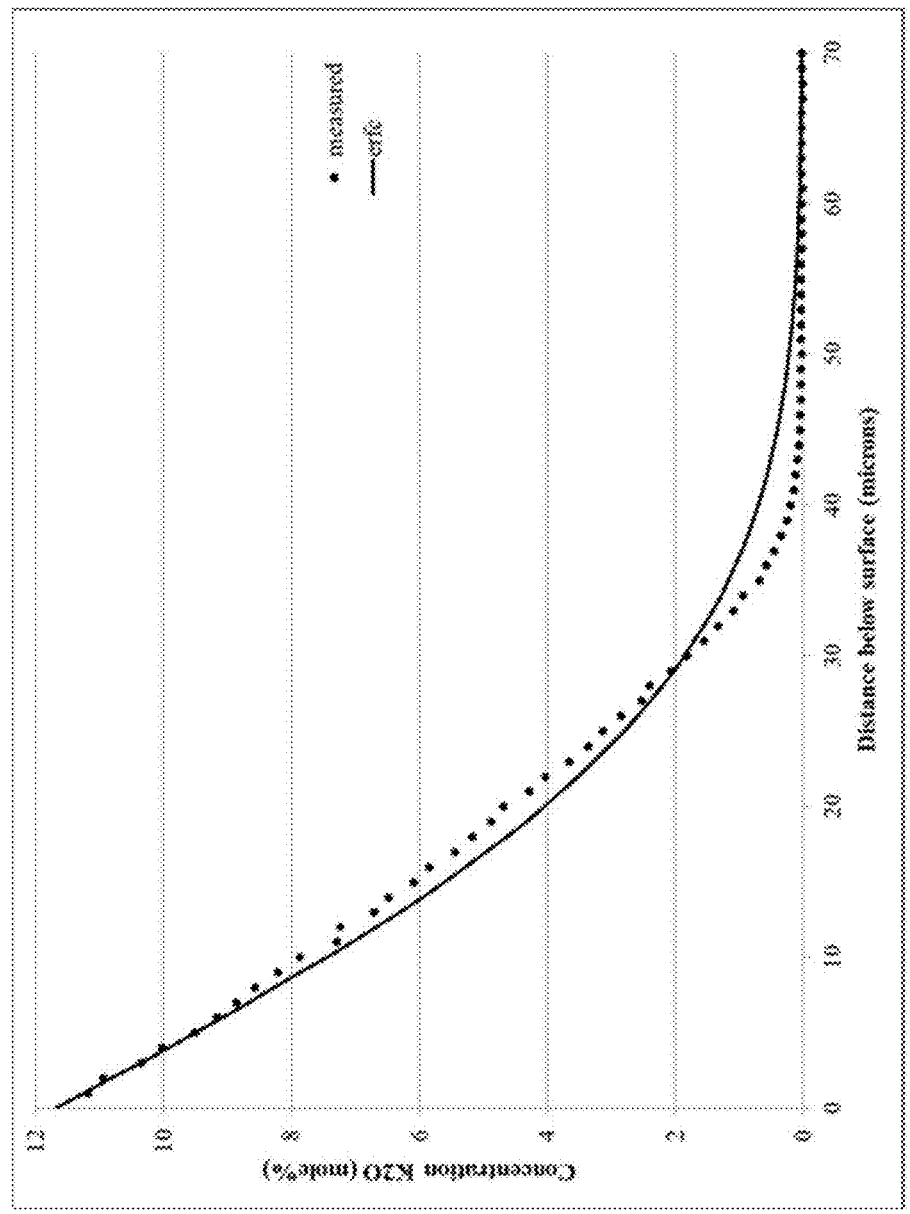
FIG. 9 shows a concentration profile of a second glass having a compressive stress that is greater than the erfc stress profile.

FIG. 9 shows a K$_2$O concentration profile Corning Gorilla® Glass Code 2320 (nominal concentration 67.55mol % SiO$_2$, 3.67 mol % B$_2$O$_3$, 12.67 mol % Al$_2$O$_3$, 13.66 mol % Na$_2$O, 0.014 mol % K$_2$O, 2.33 mol % MgO, 0 mol % CaO, 0.008 mol % Fe$_2$O$_3$, 0.005 mol % ZrO$_2$, 0.10 mol % SnO$_2$) that was ion exchanged at 420° C. for 5.5 hours. Like the Corning Gorilla® Glass Code 2319 examples shown in FIG. 6, Code 2320 glass has low amounts of K$_2$O in the base (i.e., prior to ion exchange) glass.

Through experiments over a range of ion exchangeable glass compositions, including damage resistance measurements and electron microprobe measurements of concentration, we have discovered a beneficial concentration and stress profile that results from a certain range of compositions. The beneficial concentration profile arises as a consequence of concentration-dependent mutual diffusivity. In the absence of concentration-dependent diffusivity, when the diffusivity D can be treated as constant, the diffusion equation takes the form $$\frac{\partial C}{\partial t} = D \frac{\partial}{\partial z}\left(\frac{\partial C}{\partial z}\right) \qquad (1)$$

for concentration C, distance z, time t, and diffusivity D. Given a surface concentration $C_{surf}$ and base glass concentration $C_{base}$, this equation is solved by the expression $$\frac{C(z) - C_{base}}{C_{surf} - C_{base}} = \mathrm{erfc}\left(\frac{z}{2\sqrt{Dt}}\right) \qquad (2)$$

where z=0 at the surface at which C=$C_{surf}$. The erfc function is therefore the expected shape of the concentration curve in the limit in which there is little concentration dependence to the diffusivity. When potassium is present in the base glass, the curve of FIG. 8 is truncated on the left before it reaches the lowest point on the left hand side, causing a glass containing an initial nonzero amount of potassium behave more like a glass with a relatively concentration-independent diffusivity, since the average of the diffusivity over the full range of concentrations is not as far from the actual diffusivity at any concentration from surface to interior. When the base glass contains little or no potassium, a larger portion (i.e., nearly or all of the full range) of the curve shown in FIG. 8 plays a role and the diffusivity is more concentration-dependent. At large potassium concentrations, the nonlinear mutual diffusivity is high, reducing the normally positive curvature of the concentration profile, and causing the concentration at large and intermediate concentrations to be higher than that of a corresponding erfc-profile of the same surface concentration and depth of layer. Finally, in the tail of the concentration profile, when the relative K drops to low values, the concentration-dependent diffusivity falls substantially below the average, and the concentration curve penetrates less deep than the tail of the corresponding erfc curve. This explains the shape of the concentration profiles shown FIGS. 6, 7, and 9.

Because the stress substantially follows the concentration profile, the higher concentration of the larger ion ($K^+$ in the examples presented herein) relative to the erfc curve gives a higher compressive stress. Mathematically, this is expressed as $$\sigma(d) = \frac{BE}{1-\nu}(C_{avg} - C(d)) \tag{1}$$

where $\sigma$ is the stress at depth d (and compressive stress is indicated with a negative value), B is the lattice dilation coefficient, E is Young's modulus, $\nu$ is the Poisson ratio, C(d) is the concentration of the larger ion, and $C_{avg}$ is the average concentration of the larger ion, which is given by $$C_{avg} = \frac{2}{L}\int_0^{L/2} C(d)dd \tag{4}$$

and L is the thickness of the glass sample. This expression for stress ignores stress relaxation. Stress relaxation, which takes place at relatively higher ion exchange temperatures, will reduce the overall magnitude of the stress, and slightly change its shape but it will not change the qualitative conclusions given here. Higher C(d) gives higher compressive stress at any depth d and this is part of the basis of the glasses and methods described herein.

In some embodiments, the advantageous stress profile due to substantially nonlinear diffusion as described herein is obtained when the content of the strengthening larger ion (e.g., $K^+$) in the base glass prior to ion exchange is less than about 7% of the total alkali metal oxide molar content and, in some embodiments, less than about 3% of the total alkali metal oxide concentration. This concentration does not include alkaline earth oxides such as CaO and/or MgO, or other metal oxide modifiers such as, for example, ZnO. In certain embodiments, the total amount of $Na_2O$ and $K_2O$ in the glass may be about 15 mol %, of which less than about 1 mol % is $K_2O$ and more than about 14 mol % is $Na_2O$ and, in some embodiments, the amount of $K_2O$ is less than about 0.5 mol %, and that of $Na_2O$ is more than about 14.5 mol %.

The substantially smaller mutual diffusivity at low $K^+$ concentrations compared to that at high $K^+$ concentrations is due to a substantially smaller self-diffusivity of $K^+$ (the exchanging ion) compared to that of $Na^+$ (the exchanged ion). It follows that other ways to achieve the advantageous stress profiles or enhance them will include using glass compositions or states where the difference in self-diffusivity between the interchanged ions is even larger. In one non-limiting example, a well annealed (compacted) glass will have a tighter (and possibly stiffer) network, both of these properties work to enhance the difference in self-diffusivity between the larger and smaller ion, compared to a glass of the same composition but having a substantially higher fictive temperature.

In another example, the difference in activation energies of self-diffusivities of the two inter-diffusing ions can be used to increase the self-diffusivity difference, and thus further emphasize the nonlinear mutual diffusivity and obtain an even more advantageous stress profile. In a particular example, the self-diffusivity of K is smaller than that of Na at temperatures in the range 390-410° C., and the activation energy for K is larger than that of Na. This suggests that performing the ion exchange for a longer time at a lower temperature would increase the self-diffusivity difference, leading to more nonlinear diffusion and more advantageous profiles. Due to limitations on the ion exchange time, this effect may be of modest utility, or lead to a modest improvement. For glasses with nominally higher diffusivity, the effect may be used to achieve advantageous stress profiles by performing ion exchange at a temperature in the 320-370° C. range instead of at 420° C.

In another example, a larger difference in ionic diameter should result in a larger difference in self diffusivities for the two ions, and hence more nonlinear diffusion. Particular examples include exchange of K, Rb, or Cs for Li, and exchange of Rb or Cs for Na.

In another example, when surface stress is large and the DOL is limited due to central tension limitations, the profile shape may be further improved by taking advantage of stress relaxation. This situation would normally occur in glasses that already utilize the full range of concentrations of the in-diffused ion, starting with zero or minimal concentration in the non-ion exchanged glass. Such glasses are more likely to have more than adequate surface stress after ion exchange, and advantageous stress profile as described in FIG. 6, but may have limitation on the DOL due to limited thickness related to the desired application. In such examples, increasing the ion exchange temperature to a range where stress relaxation during ion exchange is non-trivial, can help make the stress profile less similar to erfc, even though the concentration profile may not be as far from erfc as possible with lower-temperature exchanges. The main reason why stress relaxation changes the stress profile shape advantageously is that stress relaxation is proportional to local stress, and hence would be strongest at the very surface, and less strong at intermediate and large depths, where the final stress is most important for the abraded ring-on-ring strength. This type of process would be advantageous mainly in cases where excessive central tension is the main concern, and where large surface compressive stress, for example, >1000 MPa, is possible at normal ion exchange conditions (where stress-relaxation is negligible).

In another example, the base glass before ion exchange not only is poor in the in-diffusing ion (e.g., K), but also has a small but nontrivial concentration of a substantially smaller ion (such as Li), in addition to the predominant ion (such as Na) being exchanged by the in-diffusing ion. In a specific example, a glass that would normally contain 15-20 mol % of alkali, almost all of it Na, would benefit from the replacement of $\frac{1}{10}$ to $\frac{1}{20}$ of the Na by Li in the base glass. This would lead to a decrease of the self-diffusivity of K in the new base glass, and an associated decrease of the nonlinear mutual diffusivity at low K concentrations (at the deepest end of the concentration profile). At the same time, it would lead to an increased mutual diffusivity at the highest K concentrations near the very surface (where K represents 90-100% of the alkali content during ion exchange), reducing the profile slope near the surface, and thus allowing for higher K concentrations at intermediate depths. Significant Li content in the base glass is normally associated with severe effects of ion-exchange bath poisoning, making it difficult to obtain a low-cost process. In this particular example, when the Li content in the glass is kept below $\frac{1}{10}$, and in particular, below $\frac{1}{20}$ of the total alkali, the bath poisoning due to Li may be reduced to a level where its effect is smaller than the bath poisoning due to Na, and thus less of a problem.

The glasses described herein comprise less than about 5 mol % $K_2O$. In some embodiments, the glasses comprise less than about 2 mol % $K_2O$, in other embodiments, less than about 2 mol % $K_2O$, less than about 1 mol % $K_2O$ in still other embodiments, and less than about 0.5 mol % $K_2O$ in other embodiments.

In some aspects, the alkali aluminosilicate glasses described herein have a compressive stress layer extending from at least one surface of the glass to a depth of layer DOL. The glass has a compressive stress CS(d) at a depth d below the surface, where 0<d≤DOL, and where CS(d)>$CS_{erfc}$(d), where $CS_{erfc}$(d) is a compressive stress at depth d determined from an error function erfc. In some embodiments, 0.4·DOL≤d≤0.6·DOL.

In another aspect, the alkali aluminosilicate glasses described herein are ion exchanged. The glass has a compressive stress layer extending from at least one surface of the glass to a depth of layer DOL, comprises a first alkali metal cation and a second alkali metal cation, wherein the first alkali metal cation is larger than the second alkali metal cation. In certain embodiments, the first cation is potassium and the second cation is sodium. The compressive stress σ(d) at a depth d within the glass is given by the equation σ(d)=(BE/1−ν)($C_{avg}$−C(d)), where B is the lattice dilation coefficient, E is Young's modulus, ν is the Poisson ratio, C(d) is the concentration of the larger ion, and $C_{avg}$ is the average concentration of the larger ion. In some embodiments, 0.4·DOL≤d≤0.6·DOL.

In some embodiments, the glass comprises from 0 mol % to about 2.5 mol % $K_2O$ and, in other embodiments, from 0 mol% to about 1 mol% $K_2O$. In some embodiments, $K_2O$ comprises less than about 7% of the total alkali metal oxide concentration and, in other embodiments, $K_2O$ comprises less than about 3% of the total alkali metal oxide concentration. In some embodiments, the glass comprises at least 14 mol % $Na_2O$ and, in certain embodiments, $Na_2O$+$K_2O$=15 mol %.

In another aspect, a method of ion exchanging an alkali aluminosilicate glass is provided. In the method, the glass is ion exchanged glass in a single ion exchange bath to form a layer under a compressive stress CS(d) that varies as a function of depth d from the surface to a depth of layer DOL, wherein CS(d)>$CS_{erfc}$(d) at 0<d≤DOL, where $CS_{erfc}$(d) is a compressive stress at depth d determined from an error function erfc. In some embodiments, 0.4·DOL≤d≤0.6·DOL. In some embodiments, the alkali aluminosilicate glass comprises at least 14 mol % $Na_2O$ and from 0 mol % to about 2.5 mol % $K_2O$ and, in other embodiments, from 0 mol % to about 1 mol % $K_2O$. In certain embodiments, $K_2O$ comprises less than about 7% of the total alkali metal oxide concentration and, in other embodiments less than about 3% of the total alkali metal oxide concentration. In some embodiments, the ion exchange bath comprises a potassium salt such as, for example, $KNO_3$ and, in certain embodiments, the ion exchange bath consists almost entirely (i.e., at least about 90 wt %) of at least one potassium salt.

Although the glass composition of the bulk of the glass differs from that of the compressive layer, the overall compositions of the pre-ion exchanged or "base" glass and ion exchanged glass are not substantially different from each other.

In some embodiments, the glass comprises: at least about 50 mol % $SiO_2$; at least about 10 mol % $R_2O$, wherein $R_2O$ comprises $Na_2O$; $Al_2O_3$; and $B_2O_3$, wherein $B_2O_3$—($R_2O$—$Al_2O_3$)≥3 mol %. In certain embodiments, the glass comprises: at least about 50 mol % $SiO_2$; from about 9 mol % to about 22 mol % $Al_2O_3$; from about 3 mol % to about 10 mol % $B_2O_3$; from about 9 mol % to about 20 mol % $Na_2O$; from 0 mol % to about 5 mol % $K_2O$; at least about 0.1 mol % MgO, ZnO, or combinations thereof, wherein 0≤MgO≤6 and 0≤ZnO≤6 mol %; and, optionally, at least one of CaO, BaO, and SrO, wherein 0 mol %≤CaO+SrO+BaO≤2 mol %. When ion exchanged, the glass, in some embodiments, has a Vickers crack initiation threshold of at least about 10 kgf. Such glasses are described in U.S. patent application Ser. No. 13/903,433, by Matthew J. Dejneka et al., entitled "Zircon Compatible, Ion Exchangeable Glass with High Damage Resistance," filed May 28, 2013, and claiming priority from U.S. Provisional Patent Application No. 61/653,489, filed May 31, 2012, and having the same title. The contents of these applications are incorporated by reference herein in their entirety.

In another embodiment, the glass comprises at least about 50 mol % $SiO_2$ and at least about 11 mol % $Na_2O$ and, when ion exchanged, has a compressive stress CS(0) at d=0 of the glass is at least about 900 MPa and the depth of layer DOL is at least about 30 μm. In some embodiments, the glass further comprises $Al_2O_3$ and at least one of $B_2O_3$, $K_2O$, MgO and ZnO, wherein −340+27.1·$Al_2O_3$−28.7·$B_2O_3$+15.6·$Na_2O$−61.4·$K_2O$+8.1·(MgO+ZnO)≥0 mol %. In certain embodiments, the glass comprises: from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO. Such glasses are described in U.S. patent application Ser. No. 13/533,298, by Matthew J. Dejneka et al., entitled "Ion Exchangeable Glass with High Compressive Stress," filed Jun. 26, 2012 and claiming priority from U.S. Provisional Patent Application No. 61/503,734, filed Jul. 1, 2011, and having the same title. The contents of these applications are incorporated by reference herein in their entirety.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. An alkali aluminosilicate glass comprising: at least about 50 mol % $SiO_2$, from about 9 mol % to about 22 mol % $Al_2O_3$; from about 3 mol % to about 10 mol % $B_2O_3$; from greater than 14 mol % to about 20 mol % $Na_2O$; from 0 mol % to 1 mol % $K_2O$; MgO, and ZnO, wherein MgO+ZnO≥0.1 mol %, 0 mol %≤MgO≤6 mol %, and 0 mol %≤ZnO≤6 mol %, and having a layer under a compressive stress CS(d) that varies as a function of depth d from a surface of the glass to a depth of layer DOL, wherein 1.2·$CS_{erfc}$(d)≥CS(d)≥1.1·$CS_{erfc}$(d) at 0.4·DOL≤d≤0.6·DOL, where $CS_{erfc}$(d) is a compressive stress at depth d determined from an error function erfc.

2. The alkali aluminosilicate glass of claim 1, wherein the glass comprises alkali metal oxides, and wherein $K_2O$ is present in a molar concentration that is less than about 7% of the total alkali metal oxide molar concentration.

3. The alkali aluminosilicate glass of claim 1, wherein the glass comprises alkali metal oxides, and wherein $K_2O$ is present in a molar concentration that is less than about 3% of the total alkali metal oxide molar concentration.

4. The alkali aluminosilicate glass of claim 1, wherein the alkali metal oxide content ($R_2O$) comprises $Na_2O$ and wherein $B_2O_3$—($R_2O$—$Al_2O_3$)≥3 mol %.

5. The alkali aluminosilicate glass of claim 4, wherein the glass has a Vickers crack initiation threshold of at least about 10 kgf.

6. The alkali aluminosilicate glass of claim 4, further comprising at least one of CaO, BaO, and SrO, wherein 0 mol %<CaO+SrO+BaO≤2 mol %.

7. The alkali aluminosilicate glass of claim 1, wherein the compressive stress CS(0) at d=0 is at least about 900 MPa and the depth of layer DOL is at least about 30 μm and wherein the glass article comprises at least about 50 mol % $SiO_2$ and at least about 11 mol % $Na_2O$.

8. The alkali aluminosilicate glass of claim 7, wherein $-340+27.1 \cdot Al_2O_3 - 28.7 \cdot B_2O_3 + 15.6 \cdot Na_2O - 61.4 \cdot K_2O + 8.1 \cdot (MgO+ZnO) \geq 0$ mol %.

9. The alkali aluminosilicate glass of claim 7, wherein the glass comprises: from about 9 mol % to about 22 mol % $Al_2O_3$; from 3 mol % to about 9 mol % $B_2O_3$; from greater than 14 mol % to about 20 mol % $Na_2O$; from 0 mol % to less than 1 mol % $K_2O$; from 0 mol % to about 6 mol % MgO; and from 0 mol % to about 1.5 mol % CaO.

10. The alkali aluminosilicate glass of claim 1, wherein $Na_2O+K_2O=15$ mol %.

11. An ion exchanged glass comprising: at least about 50 mol % $SiO_2$, from greater than 14 mol % to about 22 mol % $Al_2O_3$; from about 3 mol % to about 10 mol % $B_2O_3$; from about 9 mol % to about 20 mol % $Na_2O$; from 0 mol % to less than 1 mol % $K_2O$; MgO; and ZnO, wherein MgO+ZnO≥0.1 mol %, 0 mol %≤MgO≤6 mol %, and 0 mol %≤ZnO≤6 mol %, and wherein the compressive stress $\sigma(d)$ at a depth d is given by the equation $\sigma(d)=(BE/1-\nu)(C_{avg}-C(d))$, where B is the lattice dilation coefficient, E is Young's modulus, $\nu$ is the Poisson ratio, $C(d)$ is the concentration of $K_2O$, and $C_{avg}$ is the average concentration of $K_2O$, wherein $1.2 \cdot \sigma_{erfc}(d) \geq \sigma(d) \geq 1.1 \cdot \sigma_{erfc}(d)$, where $\sigma_{erfc}(d)$ is a compressive stress at depth d determined from an error function erfc, wherein the ion exchanged glass has a layer under a compressive stress, the layer extending from a surface of the ion exchanged glass to a depth of layer DOL, and wherein $0.4 \cdot DOL \leq d \leq 0.6 \cdot DOL$.

12. The ion exchanged glass of claim 11 wherein the glass comprises alkali metal oxides and wherein $K_2O$ is present in a molar concentration that is less than about 7% of the total alkali metal oxide molar concentration.

13. The ion exchanged glass of claim 12, wherein the glass comprises alkali metal oxides and wherein $K_2O$ is present in a molar concentration that is less than about 3% of the total alkali metal oxide molar concentration.

14. The ion exchanged glass of claim 11, wherein $Na_2O+K_2O=15$ mol %.

15. The ion exchanged glass of claim 11, $R_2O$, wherein the alkali metal oxide content ($R_2O$) comprises $Na_2O$ and wherein $B_2O_3 - (R_2O - Al_2O_3) \geq 3$ mol %.

16. The ion exchanged glass of claim 15, wherein the glass has a Vickers crack initiation threshold of at least about 10 kgf.

17. The ion exchanged glass of claim 15, further comprising at least one of CaO, BaO, and SrO, wherein 0 mol %<CaO+SrO+BaO≤2 mol %.

18. The ion exchanged glass of claim 11, wherein the compressive stress CS(0) at d=0 is at least about 900 MPa and the depth of layer DOL is at least about 30 μm, and wherein the glass article comprises at least about 50 mol % $SiO_2$ and at least about 11 mol % $Na_2O$.

19. The ion exchanged glass of claim 18, wherein $-340+27.1 \cdot Al_2O_3 - 28.7 \cdot B_2O_3 + 15.6 \cdot Na_2O - 61.4 \cdot K_2O + 8.1 \cdot (MgO+ZnO) \geq 0$ mol %.

20. The ion exchanged glass of claim 18, wherein the glass comprises: from about 9 mol % to about 22 mol % $Al_2O_3$; from 3 mol % to about 9 mol % $B_2O_3$; from greater than 14 mol % to about 20 mol % $Na_2O$; from 0 mol % to less than 1 mol % $K_2O$; from 0 mol % to about 6 mol % MgO; and from 0 mol % to about 1.5 mol % CaO.

21. A method of ion exchanging a glass, the method comprising:

ion exchanging an alkali aluminosilicate glass in a single ion exchange bath, wherein the alkali aluminosilicate glass comprises: at least about 50 mol% $SiO_2$, from about 9 mol % to about 22 mol % $Al_2O_3$; from about 3 mol % to about 10 mol % $B_2O_3$; from greater than 14 mol % to about 20 mol % $Na_2O$; from 0 mol % to 1 mol % $K_2O$; MgO; and ZnO, wherein MgO+ZnO≥0.1 mol %, 0 mol %≤MgO≤6 mol %, and 0 mol %≤ZnO≤6 mol %; and, optionally, at least one of CaO, BaO, and SrO, wherein 0 mol %≤CaO+SrO+BaO≤2 mol %, and wherein the ion exchanged glass has a layer under a compressive stress CS(d) that varies as a function of depth d from the surface to a depth of layer DOL, wherein $1.2 \cdot CS_{erfc}(d) \geq CS(d) \geq 1.1 \cdot CS_{erfc}(d)$ at $0.4 \cdot DOL \leq d \leq 0.6 \cdot DOL$, where $CS_{erfc}(d)$ is a compressive stress at depth d determined from an error function erfc.

22. The method of claim 21, wherein the glass comprises alkali metal oxides and wherein $K_2O$ comprises less than about 7% of the total alkali metal oxide concentration.

23. The method of claim 21, wherein the ion exchange bath comprises at least about 90 wt % of at least one potassium salt.

* * * * *